UNITED STATES PATENT OFFICE.

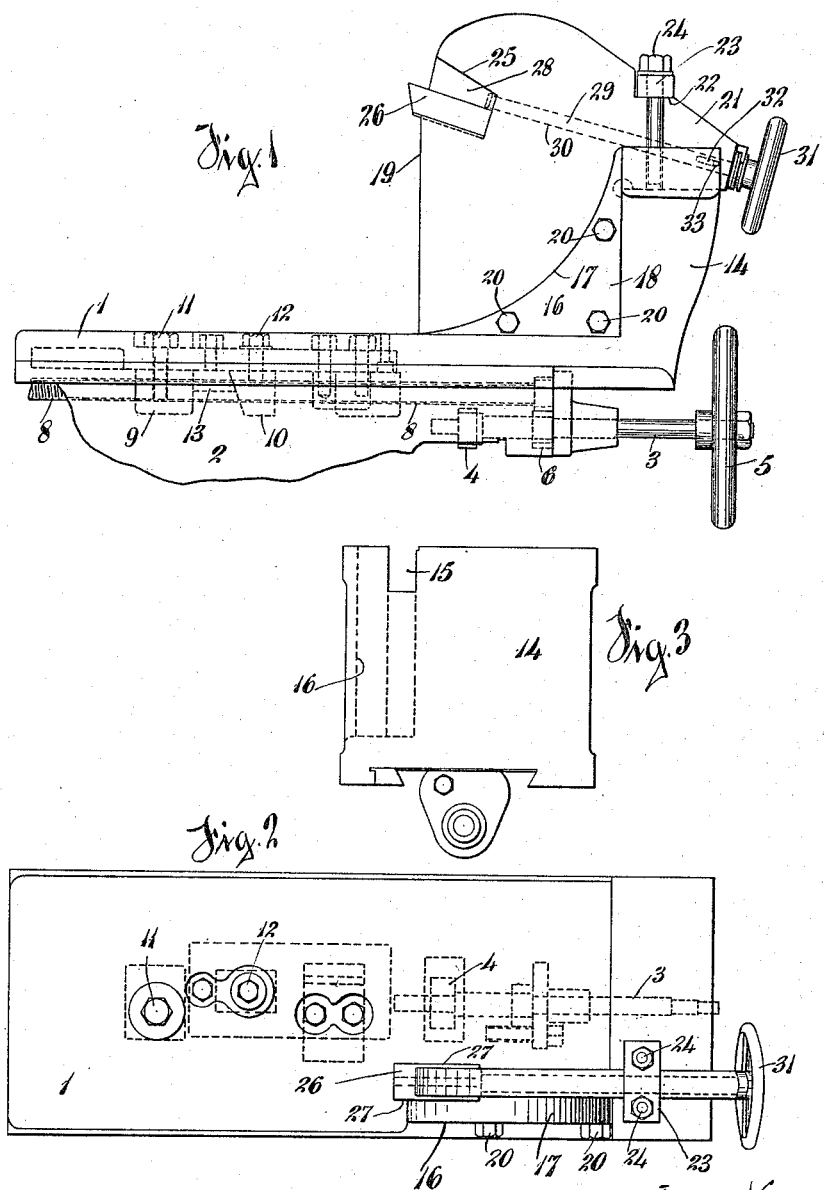

WILLIAM SCHELLENBACH, OF HARTWELL, AND WILLIAM LODGE AND NICHOLAS D. CHARD, OF CINCINNATI, OHIO, ASSIGNORS TO THE LODGE & SHIPLEY MACHINE TOOL COMPANY, OF CINCINNATI, OHIO, A CORPORATION OF OHIO.

NARROW TOOL-SUPPORT.

1,154,939.  Specification of Letters Patent.  Patented Sept. 28, 1915.

Application filed January 8, 1913. Serial No. 740,802.

*To all whom it may concern:*

Be it known that we, WILLIAM SCHELLENBACH, of Hartwell, and WILLIAM LODGE and NICHOLAS D. CHARD, of Cincinnati, in the county of Hamilton and State of Ohio, respectively, citizens of the United States, have invented certain new and useful Improvements in Narrow Tool-Supports, of which the following is a specification.

This invention relates to means for supporting a cutter for use in connection with machine tools, such as engine lathes.

One object within the contemplation of this invention is to render available a tool post adapted to use in connection with the carriage of a lathe in taking high-duty cuts in the work, and which will be of a simple yet serviceable and effective construction.

Another object is to devise a tool post construction that will possess a maximum degree of rigidity and which at the same time will enable the tool to take narrow deep cuts without any interference of the work with the tool support.

Another object is to provide a simple arrangement whereby a cutting tool may be used for taking point cuts and side cuts simultaneously.

Other objects will be in part apparent from the annexed drawings and in part pointed out in the following description in connection therewith.

In order that this invention may be so fully disclosed to those skilled in this art that they may be enabled to embody the same in the various forms and modifications to which it is readily subject, drawings exemplifying a preferred form have been appended as a part of this disclosure, and in such drawings, like characters of reference denote corresponding parts throughout all of the figures, of which:—

Figure 1 is a side elevation showing one embodiment of this invention. Fig. 2 is a plan view thereof. Fig. 3 is a front end elevation of the base showing the uprising flange.

Continuing now by way of a more detailed description, 1 indicates the traveling base that, by means of suitable guide ways is arranged to slide on a portion 2 of a carriage transversely to the guides of the lathe bed. This motion may be produced in any suitable manner as by means of a shaft 3 mounted in the part 2 and driven from the rack of the lathe bed, by the gear 4, or by the hand wheel 5. A gear 6 is keyed to the shaft 3 and meshes with a gear 7, so as to turn a feed screw 8. This feed screw is in threaded connection with two nuts 9 and 10 fixed to the base 1, by suitable bolts 11, 12, and to take up back lash a wedge block 13 may be positioned between the nuts 9 and 10, as will be understood.

Rising from the rear of the base 1 is a relatively heavy flange 14 that preferably extends entirely across the end of such space and has a recess 15, (see Fig. 3) and preferably also a web 16 serves to reinforce the flange 14 and at the same time provide for the connection of the tool supporting member. The rear edge of this web 16 is concaved about a radius extending from the center of the work, so as to provide a clearance as indicated by 17 and enable the parts to be moved as close to the work as possible without interference therewith.

The tool support is indicated by 18 and has a narrow rear edge 19, and is elongated transversely to the axis of the work as shown by the drawing. This member 18 is secured laterally to the web 16 by means of suitable bolts 20 and has a forward extension 21 that is seated in slot 15. In this upper edge there is provided a seat 22 to accommodate a cross piece 23 that is apertured at its ends. Bolts 24 pass through these apertures and have their ends tapped into the top surface of the flange 14, so as to securely clamp the portion 21 in the seat 15, as will be understood.

Extending forwardly from the rear edge of the member 18 is a slot 25, that is adapted to receive a suitable cutting tool indicated by 26. In the arrangement shown, this cutting tool not only has its cutting end extended beyond the outline of the member 18, but it also has right and left hand lateral cutting edges 27 extending beyond the lateral faces of the member 18 so that when such tool is forced into the work, and in dressing down the crank pins and sides of the crank arms of a crank shaft, it may simultaneously cut on several sides. Conveniently to enable this tool to be secured positively in place against chatter under severe strains and at the same time permit of its replacement or adjustment, a wedge block 28 is also arranged in the slot 25, and has a shank 29 passing through an aperture 30 in the supporting member 18 and terminating beyond the forward end of the portion 21. The forward end of this shank 29 is threaded and carries a suitable hand wheel 31, so that by turning such wheel, tension may be applied to the shank 29 to draw the wedge block 28 forwardly and thus clamp the tool 26 firmly in place. To prevent intermediate twist of the shank 29 it may be provided with a slot 32, through which a key or pin 33 passes.

From the foregoing it will be perceived that this invention is well adapted to achieve the objects aforesaid through a simple yet essentially rigid and effective construction.

This apparatus finds utility especially in high duty work, as in roughing out and finishing crank pins and the sides of the crank arms in a crank shaft.

Having thus described this invention, we therefore claim as new and desire to secure by Letters Patent of the United States:—

A tool-post of the nature disclosed combining a traveling base, a narrow plate-like upright tool support on said base the front edge of which is formed with a notch extending clear through the plate, the upper surface defining the notch being tapered, a taper wedge block in the notch, a screw shaft swiveled in the block and extending rearwardly through the plate, and a rotatable nut on the rear end of the screw exterior of the plate and held against longitudinal movement by the rear portion of the plate, enabling the ready release of the engagement between the wedge-block and a tool clamped thereby within the notch.

In testimony whereof, we have hereunto set our hands.

WILLIAM SCHELLENBACH.
WILLIAM LODGE.
NICHOLAS D. CHARD.

Witnesses:
CLARENCE B. FOSTER,
EMMA SPENER.